United States Patent
Oh et al.

(10) Patent No.: US 9,674,020 B2
(45) Date of Patent: Jun. 6, 2017

(54) TRANSMITTING APPARATUS, RECEIVING APPARATUS, AND CONTROLLING METHODS THEREOF

(71) Applicant: SAMSUNG ELECTRONICS CO., LTD., Suwon-si (KR)

(72) Inventors: Young-ho Oh, Suwon-si (KR); Hak-ju Lee, Seoul (KR); Jae-hyeon Bae, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/624,926

(22) Filed: Feb. 18, 2015

(65) Prior Publication Data

US 2015/0236886 A1   Aug. 20, 2015

Related U.S. Application Data

(60) Provisional application No. 62/010,495, filed on Jun. 11, 2014, provisional application No. 61/940,917, filed on Feb. 18, 2014.

(30) Foreign Application Priority Data

Nov. 24, 2014   (KR) ........................ 10-2014-0164286

(51) Int. Cl.
  *H04K 1/00*  (2006.01)
  *H04L 27/26*  (2006.01)
  (Continued)

(52) U.S. Cl.
  CPC ........ *H04L 27/2628* (2013.01); *H04L 5/0044* (2013.01); *H04L 5/0048* (2013.01);
  (Continued)

(58) Field of Classification Search
  CPC ............ H04L 27/2628; H04L 27/2618; H04L 27/265; H04L 5/0048; H04L 5/0007; H04L 5/0064
  See application file for complete search history.

(56) References Cited

U.S. PATENT DOCUMENTS 6,359,938 B1 *   3/2002   Keevill ................. H04L 1/0054
                                                   370/206
8,605,835 B2   12/2013   Matsumura
                        (Continued)

OTHER PUBLICATIONS

Communication dated Jun. 10, 2015, issued by the International Searching Authority for International Application No. PCT/KR2015/001652 (PCT/ISA/210).
(Continued)

*Primary Examiner* — Dac Ha
(74) *Attorney, Agent, or Firm* — Sughrue Mion, PLLC

(57) ABSTRACT

Provided are a transmitting apparatus, a receiving apparatus and methods of controlling these apparatuses. The transmitting apparatus includes: a structurer configured to generate a transmission stream comprising an orthogonal frequency division multiplexing (OFDM) symbol and add signaling data to the transmission stream; and a transmitter configured to insert at least one pilot into the OFDM symbol, determine a number of active carriers to be included in a frequency spectrum, corresponding to the OFDM symbol into which the pilot is inserted, which exists in a preset spectrum mask, and map the OFDM symbol, into which the pilot is inserted, onto the active carriers of the determined number, and transmit the mapped OFDM symbol.

10 Claims, 26 Drawing Sheets

(51) Int. Cl.
*H04L 25/02* (2006.01)
*H04L 25/03* (2006.01)
*H04L 5/00* (2006.01)

(52) U.S. Cl.
CPC ........ *H04L 5/0091* (2013.01); *H04L 25/0226* (2013.01); *H04L 25/03834* (2013.01); *H04L 27/265* (2013.01); *H04L 27/2618* (2013.01); *H04L 5/0007* (2013.01); *H04L 5/0064* (2013.01)

(56) References Cited

U.S. PATENT DOCUMENTS

| | | | |
|---|---|---|---|
| 2006/0034378 A1 | 2/2006 | Lindskog et al. | |
| 2006/0062314 A1* | 3/2006 | Palin | H04L 27/2626 375/260 |
| 2007/0121483 A1* | 5/2007 | Zhang | H04L 27/2624 370/208 |
| 2008/0240275 A1 | 10/2008 | Cai | |
| 2010/0128811 A1 | 5/2010 | Hassler et al. | |
| 2011/0069790 A1* | 3/2011 | Okehie | H04L 25/022 375/340 |
| 2012/0294346 A1* | 11/2012 | Kolze | H04L 27/3411 375/224 |
| 2013/0343468 A1* | 12/2013 | Ko | H04H 20/42 375/240.25 |
| 2015/0163082 A1* | 6/2015 | Mun | H04L 27/265 375/295 |
| 2016/0036613 A1* | 2/2016 | Mun | H04L 1/00 714/776 |

OTHER PUBLICATIONS

Communication dated Jun. 10, 2015, issued by the International Searching Authority in International Application No. PCT/KR2015/001652 (PCT/ISA/237).
Marco Rotoloni et al., "Maximum Likelihood Estimation of Time and Carrier Frequency Offset for DVB-T2", IEEE Transactions on Broadcasting, vol. 58, 1-15 No. 1, Mar. 2012, pp. 77-86.
Jinyong Choi et al., "Efficient pilots pattern design for multiple antenna systems". Broadband Multimedia Systems and Broadcasting (BMSB), 2010 IEEE International Symposium on, Mar. 24-26, 2010, pp. 1-4.
Jong-Seob Baek et al., "Efficient Pilot Patterns and Channel Estimations for MIMO-OFDM Systems", IEEE Transactions on Broadcasting, vol. 58, No. 4, Dec. 2012, pp. 648-653.

\* cited by examiner

FIG. 8

| FFT size | NUMBER OF ACTIVE CARRIERS | COMPARISON |
|---|---|---|
| 8192 | 6849 | 64*107+1 |
| 16384 | 13889 | 64*217+1 |
| 32768 | 28097 | 64*439+1 |

FIG. 9

| FFT size | NUMBER OF ACTIVE CARRIERS | COMPARISON |
|---|---|---|
| 8192 | 6849 | 32*214+1 |
| 16384 | 13921 | 32*435+1 |
| 32768 | 28097 | 32*878+1 |

FIG. 10

| FFT size | NUMBER OF ACTIVE CARRIERS | COMPARISON |
|---|---|---|
| 8192 | 6913 | 64*108+1 |
| 16384 | 13889 | 64*217+1 |
| 32768 | 28097 | 64*439+1 |

FIG. 11

| FFT size | NUMBER OF ACTIVE CARRIERS | COMPARISON |
|---|---|---|
| 8192 | 6913 | 32*216+1 |
| 16384 | 13921 | 32*435+1 |
| 32768 | 28097 | 32*878+1 |

FIG. 12

| MAXIMUM Dx*Dy | FFT size | NUMBER OF ACTIVE CARRIERS | COMPARISON |
|---|---|---|---|
| 128 | 8192 | 6849 | 128*54+1 |
| 256 | 16384 | 13825 | 256*54+1 |
| 128 | 32768 | 28033 | 128*219+1 |

FIG. 13

| MAXIMUM Dx*Dy | FFT size | NUMBER OF ACTIVE CARRIERS | COMPARISON |
|---|---|---|---|
| 128 | 8192 | 6785 | 128*53+1 |
| 256 | 16384 | 13825 | 256*54+1 |
| 128 | 32768 | 28033 | 128*219+1 |

FIG. 14

| MAXIMUM Dx*Dy | FFT size | NUMBER OF ACTIVE CARRIERS | COMPARISON |
|---|---|---|---|
| 128 | 8192 | 6913 | 128*54+1 |
| 256 | 16384 | 13825 | 256*54+1 |
| 256 | 32768 | 28161 | 256*110+1 |

FIG. 15

| MAXIMUM Dx*Dy | FFT size | NUMBER OF ACTIVE CARRIERS | COMPARISON |
|---|---|---|---|
| 128 | 8192 | 6785 | 128*53+1 |
| 256 | 16384 | 13825 | 256*54+1 |
| 256 | 32768 | 27905 | 256*109+1 |

FIG. 16

| REFERENCE VALUE | FFT size | NUMBER OF ACTIVE CARRIERS | COMPARISON |
|---|---|---|---|
| 384(96*4) | 8192 | 6913 | 384*18+1 |
| 384(96*4) | 16384 | 13825 | 384*36+1 |
| 192(96*2) | 32768 | 28033 | 192*146+1 |

FIG. 17

| REFERENCE VALUE | FFT size | NUMBER OF ACTIVE CARRIERS | COMPARISON |
|---|---|---|---|
| 384(96*4) | 8192 | 6529 | 384*17+1 |
| 384(96*4) | 16384 | 13441 | 384*35+1 |
| 192(96*2) | 32768 | 27841 | 192*145+1 |

FIG. 18

| REFERENCE VALUE | FFT size | NUMBER OF ACTIVE CARRIERS | COMPARISON |
|---|---|---|---|
| 384(96*4) | 8192 | 6529 | 384*17+1 |
| 384(96*4) | 16384 | 13057 | 384*34+1 |
| 192(96*2) | 32768 | 27649 | 192*144+1 |
| 192(96*2) | 32768 | 27457 | 192*143+1 |
| 192(96*2) | 32768 | 27265 | 192*142+1 |

FIG. 19

| REFERENCE VALUE | FFT size | NUMBER OF ACTIVE CARRIERS | COMPARISON |
|---|---|---|---|
| 192 | 8192 | 6913 | 192*36+1 |
| 192 | 8192 | 6721 | 192*35+1 |
| 192 | 16384 | 13825 | 192*72+1 |
| 192 | 16384 | 13633 | 192*71+1 |
| 192 | 16384 | 13441 | 192*70+1 |
| 192 | 32768 | 28033 | 192*146+1 |
| 192 | 32768 | 27841 | 192*145+1 |
| 192 | 32768 | 27649 | 192*144+1 |
| 192 | 32768 | 27457 | 192*143+1 |

US 9,674,020 B2

TRANSMITTING APPARATUS, RECEIVING APPARATUS, AND CONTROLLING METHODS THEREOF

CROSS-REFERENCE TO RELATED APPLICATIONS

This application claims priority from Korean Patent Application No. 10-2014-0164286, filed on Nov. 24, 2014, and U.S. Provisional Application Nos. 62/010,495, filed on Jun. 11, 2014, and 61/940,917, filed on Feb. 18, 2014, the disclosures of which are incorporated herein their entirety by reference.

BACKGROUND

1. Field

Apparatuses and methods consistent with exemplary embodiments relate to signal transmission using an Orthogonal Frequency Division Multiplexing (OFDM) method.

2. Description of the Related Art

Recent communication services have had multi-functions and high qualities. In particular, the development of electronic technologies has increased distribution of portable broadcasting devices such as a high-definition digital television (TV), a high specification smartphone, etc. Therefore, demands for various reception methods and various service supports of broadcasting services have increased.

According to these demands, a broadcasting communication standard, such as Digital Video Broadcasting-the Second Generation Terrestrial (DVB-T2), has been developed as an example. The DVB-T2 is a second generation European terrestrial digital broadcasting standard that improves a performance of DVB-T that is adopted as a standard in 35 or more nations of the world including Europe. The DVB-T2 applies recent technologies, such as Low Density Parity Check (LDPC) codes, 256-Quadrature Amplitude Modulation (256QAM) methods, etc., to realize increases in a transmission amount and high bandwidth efficiency. Therefore, the DVB-T2 may provide various high-quality services such as high definition TV (HDTV) in a limited band.

According to the DVB-T2, the number of active carriers increases in proportion to increases in a Fast Fourier Transform (FFT) size, and sizes of a side lobe of a bandwidth edge varies with the FFT size. Here, the DVB-T2 determines the number of active carriers according to the smallest FFT size, and increases and uses the number of active carriers in proportion to the FFT sizes. If the number of active carriers is increased and used in proportion to the FFT size as described above, there is still a possibility to use more active carriers. Therefore, the existing DVB-T2 may be inefficient.

Therefore, there is a need for a criterion and a method for determining the number of usable active carriers.

SUMMARY

Exemplary embodiments address at least the above problems and/or disadvantages and other disadvantages not described above. However, the exemplary embodiments are not required to overcome the disadvantages described above, and an exemplary embodiment may not overcome any of the problems described above.

The exemplary embodiments provide a transmitting apparatus that efficiently determines the number of active carriers, a receiving apparatus, and controlling methods thereof.

According to an aspect of an exemplary embodiment, there is provided a transmitting apparatus which may include: a structurer configured to generate a transmission stream comprising an orthogonal frequency division multiplexing (OFDM) symbol and add signaling data to the transmission stream; and a transmitter configured to insert at least one pilot into the OFDM symbol, determine a number of active carriers to be included in a frequency spectrum, corresponding to the OFDM symbol into which the pilot is inserted, which exists in a preset spectrum mask, and map the OFDM symbol, into which the pilot is inserted, onto the active carriers of the determined number, and transmit the mapped OFDM symbol.

The transmitter may adjust a size of the frequency spectrum which exists in the preset spectrum mask to determine the number of active carriers. The transmitter also may increase or decrease a number of sub-carriers for the OFDM symbol by adjusting a size of the frequency spectrum to exist in the preset spectrum mask to determine the number of active carriers.

The transmitter may determine the number of active carriers based on an arrangement pattern of scattered pilots that are insertable into the OFDM symbol.

The transmitter may determine the number of active carriers based on at least one parameter among a plurality of parameters indicating an arrangement pattern of scattered pilots and at least one edge pilot to be inserted into the OFDM symbol.

The signaling data may include information about the number of active carriers.

The transmitter may further include: a pilot generator configured to provide the pilot to a cell multiplexer which determines the number of active carriers; an Inverse Fast Fourier Transform (IFFT) processor configured to perform IFFT on the OFDM symbol, into which the pilot is inserted, in response to the OFDM symbol including the pilot being mapped onto the active carriers by the cell multiplexer; a peak-to-average-power ratio (PAPR) reducer configured to reduce a PAPR of a signal output from the IFFT processor; a guard interval inserter configured to insert a guard interval into a signal output from the PAPR reducer; and a digital-to-analog converter (DAC) configured to convert the signal, into which the guard interval is inserted, into an analog signal.

According to an aspect of another exemplary embodiment, there is provided a receiving apparatus which may include: a receiver configured to receive a transmission stream including an OFDM symbol; a detector configured to detect at least one pilot and signaling data from the OFDM symbol; a channel estimator configured to perform channel estimation based on the pilot; and a signal processor configured to acquire information about the number of active carriers, onto which the OFDM symbol is mapped, from the signaling data and signal-process the OFDM symbol based on the acquired information.

The information about the number of active carriers may include information about the number of active carriers included in a frequency spectrum, corresponding to the OFDM symbol into which the pilot is inserted, to which exists in a preset spectrum mask.

The number of active carriers may be determined based on an arrangement pattern of scattered pilots inserted in the OFDM symbol.

The number of active carriers may be determined based on at least one among a plurality of parameters indicating an arrangement pattern of scattered pilots and at least one edge pilot to be inserted into the OFDM symbol.

According to an aspect of still another exemplary embodiment, there is provided a method of controlling a transmitting apparatus which may include: generating a transmission stream including an OFDM symbol and adding signaling data to the transmission stream; inserting at least one pilot into the OFDM symbol and determining a number of active carriers to be included in a frequency spectrum, corresponding to the OFDM symbol into which the pilot is inserted, which exists in a preset spectrum mask; and mapping the OFDM symbol, into which the pilot is inserted, onto the active carriers of the determined number and transmitting the mapped OFDM symbol.

The number of active carriers may be determined based on an arrangement pattern of scattered pilots that are insertable into the OFDM symbol.

The number of active carriers may be determined based on at least one among a plurality of parameters indicating an arrangement pattern of scattered pilots and at least one edge pilot to be inserted into the OFDM symbol.

The signaling data may include information about the number of active carriers.

The method may further include: performing IFFT on the OFDM symbol into which the pilot is inserted; reducing a PAPR of a signal processed by the IFFT; inserting a guard interval into the signal having the reduced PAPR; and converting the signal, into which the guard interval is inserted, into an analog signal.

According to an aspect of still another exemplary embodiment, there is provided a method of controlling a receiving apparatus which may include: receiving a transmission stream including an OFDM symbol; detecting at least one pilot and signaling data from the OFDM symbol; performing channel estimation based on the pilot; and acquiring information about the number of active carriers, onto which the OFDM symbol is mapped, from the signaling data and signal-processing the OFDM symbol based on the acquired information.

The information about the number of active carriers may include information about the number of active carriers included in a frequency spectrum, corresponding to the OFDM symbol, into which the pilot is inserted, which exists in a preset spectrum mask.

The number of active carriers may be determined based on an arrangement pattern of scattered pilots inserted in the OFDM symbol.

The number of active carriers may be determined based on at least one among a plurality of parameters indicating an arrangement pattern of scattered pilots and at least one edge pilot inserted in the OFDM symbol.

BRIEF DESCRIPTION OF THE DRAWINGS

The above and/or other aspects will be more apparent by describing certain exemplary embodiments with reference to the accompanying drawings, in which:

FIGS. 8 through 19 are tables arranging the numbers of active carriers that are determined according to Fast Fourier Transform (FFT) sizes and arrangement patterns of pilots, according to an exemplary embodiment;

DETAILED DESCRIPTION OF THE EXEMPLARY EMBODIMENTS

Figure 1:
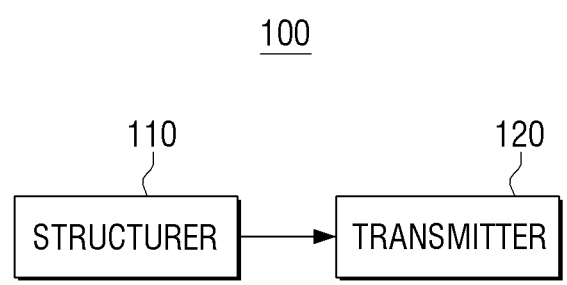
FIG. 1 is a block diagram illustrating a structure of a transmitting apparatus, according to an exemplary embodiment.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail. Also, terminologies that will be described hereinafter are defined in consideration of functions in the inventive concept and may be changed according to intentions, customs, or the like of users or operators. Therefore, the definition of the terminologies may be given based on overall contents of the present embodiments.

FIG. 1 is a block diagram illustrating a structure of a transmitting apparatus 100 according to an exemplary embodiment.

Referring to FIG. 1, the transmitting apparatus 100 includes a structurer 110 and a transmitter 120.

The structurer 110 generates a transmission stream which includes an Orthogonal Frequency Division Multiplexing (OFDM) symbol and adds signaling data to the transmission stream. Here, the signaling data includes information such as parameters, etc. necessary for decoding a data symbol at a receiving apparatus of the transmission stream, as will be described later. Also, before the structurer 110 generates the transmission stream including the OFDM symbol, an input processor (not shown) and a Bit Interleaved and Coded Modulation (BICM) processor (not shown) of an Advanced Television System Committee (ATSC) 3.0 system generate a baseband frame and process the generated baseband frame. This process will be also described in detail later.

The transmitter 120 inserts at least one pilot into the OFDM symbol and determines the number of active carriers to be included in a spectrum, corresponding to the OFDM symbol into which the pilot is inserted, which exists in a preset spectrum mask.

Here, the pilot may be used for channel estimation, equalization, common phase estimation (CPE) and synchronization.

The pilot may include at least one scattered pilot, at least one continual pilot, at least one frame closing pilot of a frame closing symbol, etc.

The pilot may be inserted according to a particular arrangement pattern, for example, an arrangement pattern of scattered pilots may be defined as in Table 1 below.

TABLE 1

| Pilot Pattern | Separation of pilot bearing Pilot pattern ($D_x$) | Number of symbols forming one scattered Pilot sequence ($D_y$) |
|---|---|---|
| P4,4 | 4 | 4 |
| P8,2 | 8 | 2 |
| P16,2 | 16 | 2 |
| P16,4 | 16 | 4 |
| P32,2 | 32 | 2 |

For example, P4,4 refers to a pattern of Dx=4, Dy=4 which indicates that scattered pilots are arranged at the same interval of 16 in 4 columns. Scattered pilots inserted into a data symbol will be described as an example. If scattered pilots are arranged at the same interval of 16 in a first column of the data symbol, scattered pilots in a second column of the data symbol are not arranged at the same interval of 16 in the same position as the first column of the data symbols. Therefore, the scattered pilots inserted into the second column are arranged with 4 rows apart from the scattered pilots inserted into the first column of the data symbol. Therefore, the scattered pilots may be arranged at the same interval of 16 in each of 4 columns with 4 rows apart.

Also, the transmitter 120 may adjust or control the spectrum corresponding to the OFDM symbol, into which the pilot is inserted, to meet a preset condition. Here, the preset condition is that the spectrum corresponding to the OFDM symbol, into which the pilot is inserted, exists in a preset spectrum mask.

The preset spectrum mask is variously set according to nations, districts, or the like and is set to minimize interference between adjacent transmission channels. In other words, if the spectrum corresponding to the OFDM symbol into which the pilot is inserted, i.e., a waveform (also referred to as a spectrum, a waveform spectrum or a frequency spectrum) appearing in a frequency domain after Fast Fourier Transform (FFT), is not limited within a standard of the preset spectrum mask, the interference between the adjacent transmission channels increases. Therefore, it is difficult to stably transmit data.

All sub-carriers in all fractions corresponding to an FFT size are not used to transmit information, but a few of sub-carriers are used to transmit information. Sub-carriers that are substantially used to transmit information or data are referred to as active carriers.

If the number of active carriers increases, sub-carriers that are used to transmit information increases by the number of active carriers. Therefore, a data transmission rate increases.

Therefore, the transmitter 120 may determine the number of active carriers to be included in a spectrum, corresponding to the OFDM symbol into which the pilot is inserted, which exists in the preset spectrum mask. As described above, the transmitter 120 may maximally increase the number of sub-carriers that are usable in transmitting data by adjusting the waveform, appearing in the frequency domain and corresponding to the OFDM symbol into which the pilot is inserted, to exist in the preset spectrum mask.

The reasons are as follows. If the number of active carriers increases, a bandwidth of the waveform appearing in the frequency domain corresponding to the OFDM symbol increases, and a position of a frequency in which a side lobe appears becomes apart from a center frequency. However, if the number of active carriers decreases, the bandwidth of the waveform appearing in the frequency domain corresponding to the OFDM symbol decreases, and the position of the frequency in which the side lobe appears becomes closer to the center frequency.

Also, a size of the side lobe decreases with an increase in an FFT size but increases with a decrease in the FFT size.

Although the increase in the FFT size increases the number of active carriers so as to increase the bandwidth of the waveform appearing in the frequency domain corresponding to the OFDM symbol, the size of the side lobe may decrease, and thus, the waveform may stray from a range of the preset spectrum mask. Here, the number of sub-carriers corresponding to a maximally increased bandwidth may be determined as the maximally increased number of active carriers.

The side lobe corresponds to a part that decreases from an edge of the bandwidth and increases with the increase in the FFT size, and thus the size of the side lobe relatively decreases. However, that part decreases with a decrease in the FFT size, and thus the size of the side lobe relatively increases.

As described above, the transmitter 120 may adjust or control the waveform appearing in the frequency domain and corresponding to the OFDM symbol of the transmission stream to exist in the spectrum mask, and determine the number of active carriers in consideration of a relation between the side lobe and the number of sub-carriers.

The transmitter 120 may also map the OFDM symbol, into which the pilot is inserted, onto the determined number of active carriers, and transmit the mapped OFDM symbol. The structurer 110 and the transmitter 120 described above are included in the ATSC 3.0 system, and thus, the ATSC 3.0 system will now be described.

Figure 2:
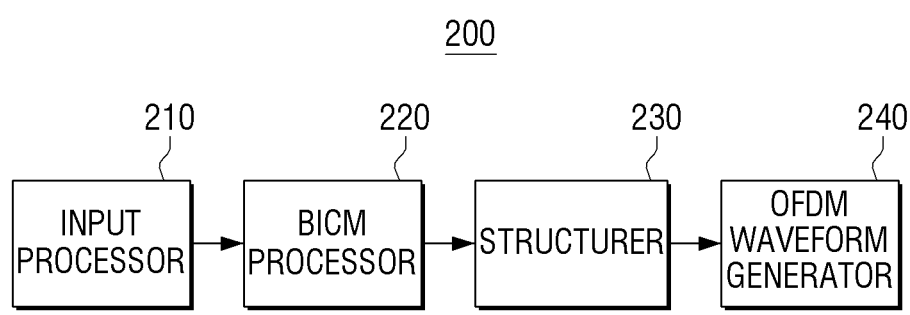
FIG. 2 is a block diagram illustrating a structure of an Advanced Television System Committee (ATSC) 3.0 system, according to an exemplary embodiment.

FIG. 2 is a block diagram illustrating a structure of an ATSC 3.0 system 200, according to an exemplary embodiment.

Referring to FIG. 2, the ATSC 3.0 system 200 includes an input processor 210, a BICM processor 220, a structurer 230, and an OFDM waveform generator 240.

The input processor 210 may divide a plurality of input streams into a plurality of baseband frames. In detail, the input processor 210 outputs at least one physical layer pipes (PLPs) that are allocated to a plurality of baseband frames. According to an exemplary embodiment, a DVB-T2 system applies a PLP concept of providing one broadcasting channel with various broadcasting services having different modulation methods, channel coding rates, time and cell interleaving lengths, etc.

Here, the PLP refers to a signal path that is independently processed. In other words, respective services (e.g., video, expanded video, audio, data stream, etc.) may be transmitted and received through a plurality of radio frequency (RF)

channels, and thus the PLP is a path through which these services are transmitted or a stream that is transmitted through the path. Also, the PLP may be positioned in slots that are distributed at time intervals on the plurality of RF channels or may be distributed at time intervals on one RF channel. In other words, one PLP may be distributed at time intervals on one RF channel or on a plurality of RF channels to be transmitted A PLP structure includes input mode A providing one PLP and input mode B providing a plurality of PLPs. In particular, if the input mode B is supported, a robust particular service may be provided, and one stream may be scattered and transmitted to increase a time interleaving length in order to acquire a time diversity gain. Also, if only a particular stream is received, a receiver may be turned off for the rest of time to be used at low power in order to be appropriate for providing portable and mobile broadcasting services.

Here, the time diversity refers to a technology by which a transmitting side transmits the same signal several times at preset time intervals to reduce deterioration in a transmission quality on a mobile communication transmission path, and a receiving side synthesizes the received signals to acquire a high transmission quality.

Information that may be commonly transmitted to a plurality of PLPs may be included in one PLP to be transmitted so as to increase transmission efficiency. Here, PLP0 performs this operation. Such a PLP may be referred to as a common PLP, and other PLPs except PLP0 may be used to transmit data and may be referred to as data PLPs.

If such a PLP is used, while HDTV programs are received at home, and standard definition television (SDTV) programs may also be provided at portable and mobile devices. Also, various broadcasting services may be provided to viewers through broadcasting stations or broadcasting content providers, and differentiated services may be provided to enable receiving of broadcastings even in fringe areas where receptions are poor.

In other words, the input processor 210 maps data, which is to be transmitted, onto at least one signal processing path to generate frames and performs signal processing on each of the at least one signal processing path. For example, the signal processing may include at least one of input stream synchronization, delay compensation, null packet deletion, cyclic redundancy check (CRC) encoding, header insertion, coding, interleaving, and modulation. The frames that are signal-processed according to each of the signal processing paths are generated as one transmission frame together with signaling information, and the generated transmission frame is transmitted to a receiving apparatus (not shown).

The BICM processor 220 performs forward error coding (FEC), constellation mapping and interleaving on each of a plurality of baseband frames, and then, outputs the plurality of baseband frames.

In detail, if a plurality of randomized baseband frames are input into the BICM processor 220, the plurality of randomized baseband frames are encoded as BCH codes and then encoded as LDPC codes. The plurality of encoded baseband frames are interleaved by a bit interleaver, and the interleaved bits are mapped onto a constellation symbol according to a quadrature phase shift keying (QPSK), 16-QPSK, or higher quadrature amplitude modulation (QAM) constellation size. A plurality of frames that are generated as described above are referred to as FEC frames. The FEC frames are interleaved.

The structurer 230 adds signaling data to the plurality of baseband frames output from the BICM processor 220 to generate an OFDM symbol.

In detail, the structurer 230 schedules a time-interleaved frame as a stream of data cells. The data cells are interleaved on a frequency axis. An ATSC 3.0 frame is generated from the data cells that are interleaved on the frequency axis. Physical layer signaling that is referred to as L1 signaling is inserted as an 8K preamble symbol into a start point of each of ATSC 3.0 frames. The L1 signaling is used to rapidly synchronize each frame.

The OFDM waveform generator 240 performs inverse FFT (IFFT) on the ATSC 3.0 frame into which the preamble symbol is inserted, to convert the ATSC 3.0 frame into a signal on a time axis. The OFDM waveform generator 240 also inserts a guard interval into each symbol to avoid interference between symbols, and performs digital-to-analog conversion on the signal on the time axis to generate and transmit a baseband analog signal.

In particular, the OFDM waveform generator 240 selects at least one from a plurality of pilot patterns based on an FFT size and a guard interval fraction, inserts at least one pilot into an OFDM symbol according to the selected pilot pattern, and transmits a stream including the OFDM symbol into which the pilot is inserted.

The OFDM waveform generator 240 inserts the data cell, at least one continuous pilot, and at least one scattered pilot into the ATSC 3.0 frame. Therefore, the receiving apparatus (not shown) may perform channel estimation by using the pilot and compensate for frequency offset. A tone reservation for reducing a peak-to-average-power ratio (PAPR) may be selectively inserted.

In detail, various types of cells that are inserted into the ATSC 3.0 frame are modulated into pieces of reference information that the receiving apparatus knows about. Information that is transmitted by these cells have a form of at least one scattered, continuous, edge, frame-start, or frame-closing pilot.

Here, the structurer 110 and the transmitter 120 according to an exemplary embodiment may respectively correspond to the structurer 230 and the OFDM waveform generator 240 of FIG. 2.

The transmitting apparatus 100 may transmit a transmission stream including an OFDM symbol to a receiving apparatus together with information about the number of active carriers determined by the transmitter 120. Here, the transmitting apparatus 100 may include the information about the number of active carriers in signaling data, and then, transmit the signaling data. Here, a signaling generator that generates the signaling data for including the information about the number of active carriers will now be described in detail with reference to FIG. 3.

Figure 3:
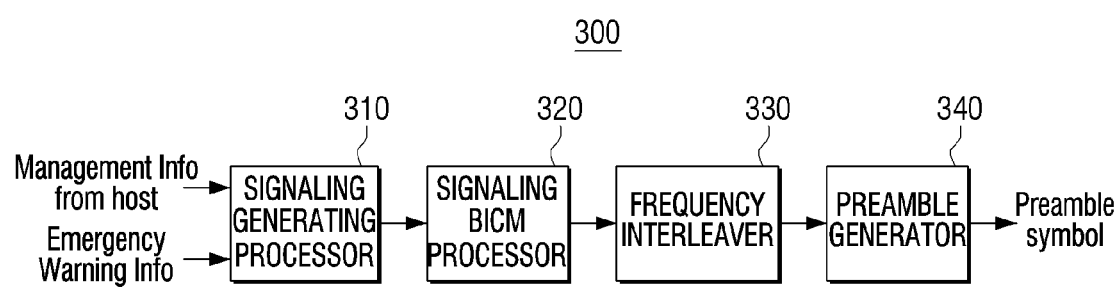
FIG. 3 is a block diagram illustrating a structure of a signaling generator that is used in an ATSC 3.0 system, according to an exemplary embodiment.

FIG. 3 is a block diagram illustrating a structure of a signaling generator 300 used in an ATSC 3.0 system, according to an exemplary embodiment.

Referring to FIG. 3, the signaling generator 300 includes a signaling generating processor 310, a signaling BICM processor 320, a frequency interleaver 330 and a preamble generator 340.

The signaling generating processor 310 generates all types of signaling data that are necessary for decoding various types of PLPs included in a data symbol area at a receiving apparatus (not shown). The signaling generating processor 310 may insert data about an emergence warning system (EWS) into signaling data. The receiving apparatus may simply only process a preamble symbol to detect the data about the EWS.

The signaling BICM processor 320 and the frequency interleaver 330 interleave the generated signaling data in the unit of bits and in the unit of frequencies, respectively. Also, the preamble generator 340 generates and outputs a preamble symbol including the interleaved signaling data.

Figure 4:
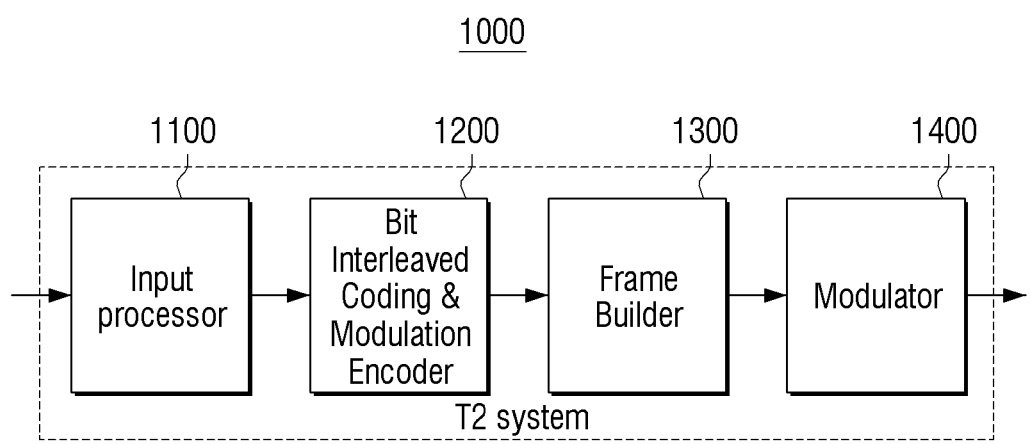
FIG. 4 is a block diagram illustrating a structure of a Digital Video Broadcasting-the Second Generation Terrestrial (DVB-T2) transmitting system, according to an exemplary embodiment.

FIG. 4 is a block diagram illustrating a structure of a DVB-T2 transmitting system 1000, according to an exemplary embodiment.

Referring to FIG. 4, the DVB-T2 transmitting system 1000 may include an input processor 1100, a BICM encoder 1200, a frame builder 1300, and a modulator 1400.

Elements of the DVB-T2 transmitting system 1000 will be described in brief in that contents of the DVB-T2 transmitting system 1000 are the same as contents defined in DVB-T2 as one of European digital broadcasting standards. For detailed contents, "Digital Video Broadcasting (DVB); Frame structure channel coding and modulation for a second generation digital terrestrial television broadcasting system (DVB-T2) (2012-04)" is referred to.

The input processor 1100 generates a baseband frame from an input frame of data to be serviced. Here, the input stream may be a moving pictures experts group-2 (MPEG-2) transport stream (TS), a generic stream (GS), or the like.

The BICM encoder 1200 determines an FEC rate and a constellation order according to an area (e.g., a fixed PHY frame or a mobile PHY frame), in which data to be serviced will be transmitted, to perform encoding. Signaling information about the data to be serviced may be encoded through an additional BICM encoder (not shown) or may be shared with the data to be serviced to be encoded through the BICM encoder 1200 according to realizations.

The frame builder 1300 and the modulator 1400 determine an OFDM parameter for a signaling area and an OFDM parameter for the area in which the data to be serviced will be transmitted, to form a frame, and adds a sync area to generate a frame. Modulation is performed to modulate the generated frame into an RF signal, and the RF signal is transmitted to a receiving apparatus.

The input processor 210, the BICM processor 220, the structurer 230, and the OFDM waveform generator 240 of the ATSC 3.0 system 200 described with reference to FIG. 2 may respectively correspond to the input processor 1100, the BICM encoder 1200, the frame builder 1300, and the modulator 1400 of FIG. 4. An operation that is performed by the structurer 110 described with reference to FIG. 1 may be performed by the frame builder 1300, and operations that are performed by the transmitter 120 may be performed by the modulator 1400.

The transmitter 120 includes a cell multiplexer that determines the number of active carriers to be included in a spectrum, corresponding to the OFDM symbol into which at least one pilot is inserted, which exists in a preset spectrum mask.

Here, the cell multiplexer is one of a plurality of elements constituting the OFDM waveform generator 240 described with reference to FIG. 2, and performs an operation of multiplexing a data cell, and at least one continuous pilot and at least one scattered pilot provided from a tone reservation cell and pilot generator and inserting the multiplexed data cell, continuous pilot, and scattered pilot into an ATSC 3.0 frame.

In detail, the transmitter 120 may additionally include a plurality of elements besides the cell multiplexer, and thus a detailed structure of the transmitter 120 will now be described with reference to FIG. 5.

Figure 5:
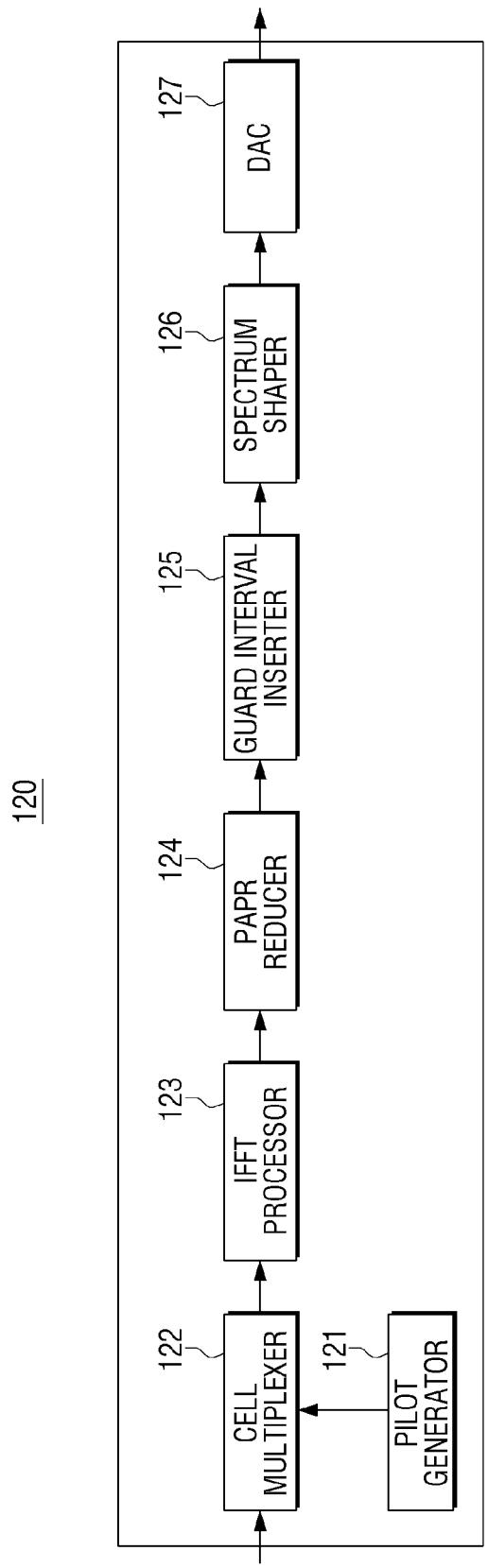
FIG. 5 is a block diagram illustrating a detailed structure of a transmitter, according to an exemplary embodiment.

FIG. 5 is a block diagram illustrating a detailed structure of the transmitter 120, according to an exemplary embodiment.

Referring to FIG. 5, the transmitter 120 includes a pilot generator 121, a cell multiplexer 122, an IFFT processor 123, a PAPR reducer 124, a guard interval inserter 125, a spectrum shaper 126, and a digital-to-analog converter (ADC) 127.

The pilot generator 121 generates at least one pilot and at least one tone reservation cell, and provides the pilot, including at least one continuous pilot and at least one scattered pilot, and the tone reservation cell to the cell multiplexer 122. The cell multiplexer 122 multiplexes a data cell and the pilot, and inserts the multiplexed data cell and pilot into an ATSC 3.0 frame. Therefore, a receiving apparatus (not shown) may perform channel estimation and compensate for frequency offset by using the pilot. Also, the tone reservation cell may be selectively used to reduce a PAPR.

If the cell multiplexer 122 maps an OFDM symbol, into which the pilot and the tone reservation cell are inserted, onto the ATSC 3.0 frame, the IFFT processor 123 transforms the ATSC 3.0 frame, into which the pilot and the tone reservation cell are inserted, into a signal on a time axis The PAPR reducer 124 calculates a size of a PAPR pilot from the transformed signal on the time axis to reduce a size of a PAPR. In detail, the PAPR refers to a ratio of peak power to average power and is a criterion for displaying an effect of a baseband transmission signal on a transmitter. In other words, in general, power of the transmitter means average power, but peak power exists in substantially transmitted power. If this peak power is not appropriately designed, intermodulation occurs, which causes deterioration in a broadcasting quality. Therefore, the transmitting apparatus 100 may transmit a broadcasting signal to enable the PAPR to be reduced.

The guard interval inserter 125 inserts a guard interval into each symbol of a signal output from the PAPR reducer 124 to prevent interference between symbols.

The spectrum shaper 126 may perform filtering on a signal output from the guard interval inserter 125 to minimize interference between adjacent transmission channels. In detail, after an OFDM symbol is generated, shaping of a spectrum is improved, and filtering is provided to clearly distinguish adjacent channels from one another. However, in general, an impulse response of filtering for shaping the spectrum reduces a length of an effective signal, and thus a filter length may be shortened. However, flat filters having no ripples may be filters having higher orders. Therefore, an effective spectrum of an OFDM signal may be shaped, and a length of a filter may be shortened to minimize the length of the filter and a loss of an effective guard interval The DAC 127 may convert a signal, whose spectrum is shaped, into an analog signal and transmit the analog signal.

Figure 6:
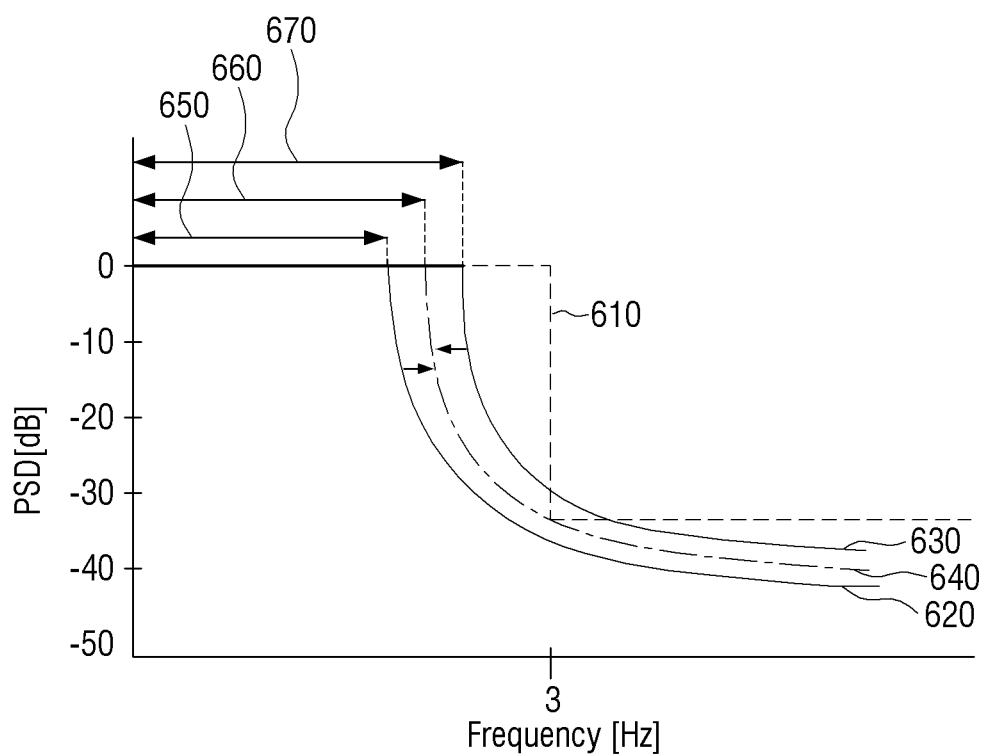
FIG. 6 is a graph illustrating a method of determining the number of active carriers, according to an exemplary embodiment.

FIG. 6 is a graph illustrating a method of determining the number of active carriers, according to an exemplary embodiment.

Referring to FIG. 6, a waveform (also referred to as a spectrum, a waveform spectrum or a frequency spectrum) in a frequency domain corresponding to an OFDM symbol may or may not be limited within a preset spectrum mask 610.

For example, a spectrum 620 corresponding to a first OFDM symbol is limited within a preset spectrum mask 610 in the frequency domain, specifically in a frequency-power spectral density (PSD) graph, and a spectrum 630 corresponding to a second OFDM symbol is not limited within the preset spectrum mask 610.

Also, the number of active carriers for the spectrum 620 corresponding to the first OFDM symbol corresponds to a bandwidth fraction 650 of the spectrum 620 corresponding to the first OFDM symbol. In other words, if the number of active carriers increases, a length of the bandwidth fraction 650 of the spectrum 620 corresponding to the first OFDM symbol increases. If the number of active carriers decreases, the length of the bandwidth fraction 650 of the spectrum 620 corresponding to the first OFDM symbol decreases. This is equally applied to a bandwidth 670 of the spectrum 630 corresponding to the second OFDM symbol.

The spectrum 620 corresponding to the first OFDM symbol may be able to increase the number of active carriers in comparison with the preset spectrum mask 610. Therefore, the cell multiplexer 122 may increase the number of active carriers to enable the spectrum 620 corresponding to the first OFDM symbol to become a spectrum 640 corresponding to a third OFDM symbol. As a result, the length of the bandwidth fraction 650 of the spectrum 620 corresponding to the first OFDM symbol increases to a length of a bandwidth fraction 660 of the spectrum 640 corresponding to the third OFDM symbol.

Since the spectrum 630 corresponding to the second OFDM symbol is not limited within the preset spectrum mask 610, the number of active carriers may be decreased. The cell multiplexer 122 may decrease the number of active carriers to enable the spectrum 620 corresponding to the second OFDM symbol to become the spectrum 640 corresponding to the third OFDM symbol. Therefore, the length of a bandwidth fraction 670 of the spectrum 630 corresponding to the second OFDM symbol decreases to the length of the bandwidth fraction 660 of the spectrum 640 corresponding to the third OFDM symbol.

In detail, the cell multiplexer 122 may increase or decrease the number of active carriers based on an arrangement pattern of at least one scattered pilot, which may be inserted into the OFDM symbol, to determine the number of active carriers to be included in a spectrum, corresponding to the OFDM symbol, which exists in a preset spectrum mask.

In other words, the cell multiplexer 122 may determine the number of active carriers based on at least one parameter among a plurality of parameters indicating an arrangement pattern of at least one scattered pilot and at least one edge pilot to be inserted into the OFDM symbol.

In detail, the cell multiplexer 122 may determine the number of active carriers through Equation 1 or 2 below:

Number of Active Carriers=[Multiple of Maximum $(Dx \times Dy)+1$]  (1)

Number of Active Carriers=[(Multiple of Maximum $(Dx)+1$]  (2), where Dx and Dy denote arrangement intervals of a pilot constituting an arrangement pattern of the pilot and the number of OFDM symbols that are necessary until the pilot is disposed in the same position on an OFDM symbol, and 1 is added because of pilots that are inserted into start and end parts of active carriers, i.e., edge pilots. Here, the Dx and Dy may be the same Dx and Dy defined in the "Digital Video Broadcasting (DVB); Frame structure channel coding and modulation for a second generation digital terrestrial television broadcasting system (DVB-T2) (2012-04)". Since an edge pilot that is inserted into the start part of the active carriers is the same as a start of at least one scattered pilot, the number of active carriers does not increase. However, since an edge pilot that is inserted into the end part of the active carriers does not overlap the scattered pilot, one more active carrier for this edge pilot is required.

This will be described in more detail with reference to a view illustrating an arrangement pattern in which pilots are disposed.

Figure 7:
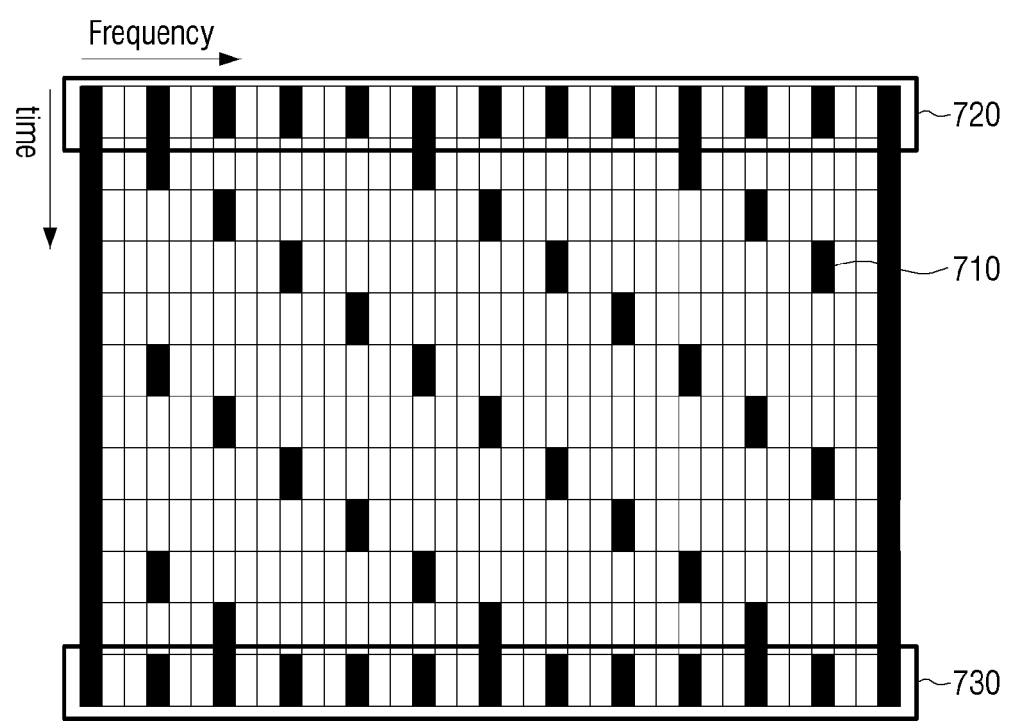
FIG. 7 is a view illustrating an arrangement pattern of pilots, according to an exemplary embodiment.

FIG. 7 is a view illustrating an arrangement pattern of pilots, according to an exemplary embodiment.

Referring to FIG. 7, pilots 710 are inserted into a data symbol area in a preset patterns, pilots 720 are inserted into a frame starting symbol at a front end of the data symbol area, and pilots 730 are inserted into a frame closing symbol at a back end of the data symbol area.

An arrangement pattern of the pilots shown in FIG. 7 is Dx=3, Dy=4. Therefore, the cell multiplexer 122 may add 1 to a multiple of 12, which is Dx×Dy, by using Equation 1 above to determine the number of active carriers. The number of active carriers shown in FIG. 7 may be calculated as 12×3+1.

Also, the cell multiplexer 122 may add 1 to a multiple of Dx=3 to determine the number of active carriers, and the number of active carriers shown in FIG. 7 may be calculated as 3×12+1.

In particular, in order to uniformly use the number of active carriers corresponding to a data symbol when at least one continuous pilot is inserted into the data symbol, the cell multiplexer 122 may determine the number of active carriers through Equation 1. Also, the cell multiplexer 122 may determine the number of active carriers through Equation 2 to enable a receiving apparatus to simply perform signal-processing without performing exceptional processing.

FIGS. 8 through 19 are tables arranging the numbers of active carriers that are determined according to FFT sizes and arrangement patterns of pilots, according to an exemplary embodiment.

Referring to FIG. 8, if the maximum value of Dx×Dy or the maximum value of Dx is 64, an FFT size is changed into 8192, 16384, and 32768. Therefore, the number of active carriers may be calculated as 6849, 13889, and 28097 by 64×107+1, 64×217+1, and 64×439+1 where 1 is added to multiples of 64.

FIG. 9 illustrates the numbers of active carriers that are calculated as the FFT size is changed into 8192, 16384, and 32768 if the maximum value of Dx×Dy or the maximum value of Dx is 32. The maximum value of Dx×Dy or the maximum value of Dx shown in FIG. 8 as 64 is different from the maximum value of Dx×Dy or the maximum value of Dx as 32. Therefore, FIGS. 8 and 9 respectively illustrate the number of active carriers that are calculated based on arrangement patterns of different pilots.

As shown in FIGS. 8 and 9, FIGS. 10 and 11 illustrate the numbers of active carriers that are calculated when the FFT size is changed into 8192, 16384, and 32768 if the maximum value of Dx×Dy or the maximum value of Dx is 64 or 32. However, multiples by which 64 and 32 are multiplied, respectively, are different from those of FIGS. 8 and 9. Therefore, the calculated numbers of active carriers shown in FIGS. 10 and 11 are different from the calculated numbers of active carriers shown in FIGS. 8 and 9. In terms of effects, a data transmission rate acquired in case of FIGS. 10 and 11 is higher than a data transmission rate acquired in case of FIGS. 8 and 9.

Similarly, FIGS. 12 through 15 illustrate the numbers of active carriers that are calculated if a maximum value of Dx×Dy or a maximum of Dx is 128 and 256, i.e., arrangement patterns of pilots are changed.

If Dx constituting an arrangement pattern of pilots is expressed as a multiple of one integer M, the cell multiplexer 122 may calculate the number of active carriers through Equation 1 or 2 above. If Dx is not expressed as the multiple of the one integer M, i.e., Dx is expressed as multiples of integers M1 and M2, the cell multiplexer 122 may calculate the least common multiple R of the maximum Dx1 and the maximum Dx2 that are expressed as the multiples of the integers M1 and M2, as in Equation 3 below. The cell multiplexer 133 may add 1 to a multiple of a number that is acquired by multiplying the calculated least common multiplex R and maximum Dy, to determine the number of active carriers.

Number of Active Carriers=[Multiple of((Least Common Multiple $R$)×(Maximum $Dy$))+1]     (3)

For example, if Dx is 3, 6, 12, and 24 that are expressed as multiples of 3, the cell multiplexer 122 may add 1 to a multiple of a number that is acquired by taking the maximum value of Dx (=24)×Dy or add 1 to a multiple of the maximum Dx 24 to determine the number of active carriers.

However, if Dx is 3, 4, 6, 8, 12, 16, 24, and 32 that are expressed as multiples of 3 and 4, the cell multiplexer 122 may acquire the least common multiple 96 of 32, which is the maximum Dx expressed as a multiple of 4, and 24, which is the maximum Dx expressed as a multiple of 3, and add 1 to a multiple of a number that is acquired by multiplying the least common multiple 96 and the maximum Dy, to determine the number of active carriers.

If Dx constituting an arrangement pattern of pilots is expressed as a multiple of integers M1 and M2, the cell multiplexer 122 may also calculate the least common multiple R' of the maximum value of Dx1×Dy1 among arrangement patterns of scattered pilots using Dx1 expressed as a multiple of integer M1 among arrangement patterns of usable scattered pilots and the maximum value of Dx2×Dy2 among arrangement patterns of scattered pilots using Dx2 expressed as a multiple of integer M2, as in Equation 4 below. Also, the cell multiplexer 122 may add 1 to a multiple of the least common multiple R' to determine the number of active carriers.

Number of Active Carriers=[Multiple of(Least Common Multiple $R'$)+1]     (4)

For example, if Dx is 3, 4, 6, 8, 12, 16, 24, and 32 expressed as multiples of 3 and 4, Dy is 2 and 4, Dx is 3, 4, 6, 8, 12, 16, and 24 excluding Dx=32 from an arrangement pattern of used scattered pilots allows Dy=2 and Dy=4, and Dx=32 allows only Dy=2, the cell multiplexer 122 may acquire the least common multiple 192 of 96 (=24×4) of the maximum (Dx1×Dy1) expressed as a multiple of 3 and 64 (=32×2) of the maximum (Dx2×Dy2) expressed as a multiple of 4 and add 1 to a multiple of the least common multiple 192 to determine the number of active carriers.

FIGS. 16 through 19 illustrate the numbers of active carriers that are calculated through the above-described method if Dx is 3, 4, 6, 8, 12, 16, 24, and 32, and Dy is 2 or 4.

The cell multiplexer 122 may add information about the determined number of active carriers to signaling data and transmit the signaling data including this information to a receiving apparatus (not shown). The signaling data may be L1 signaling information that is inserted into a preamble symbol, which will now be described.

Figure 20:
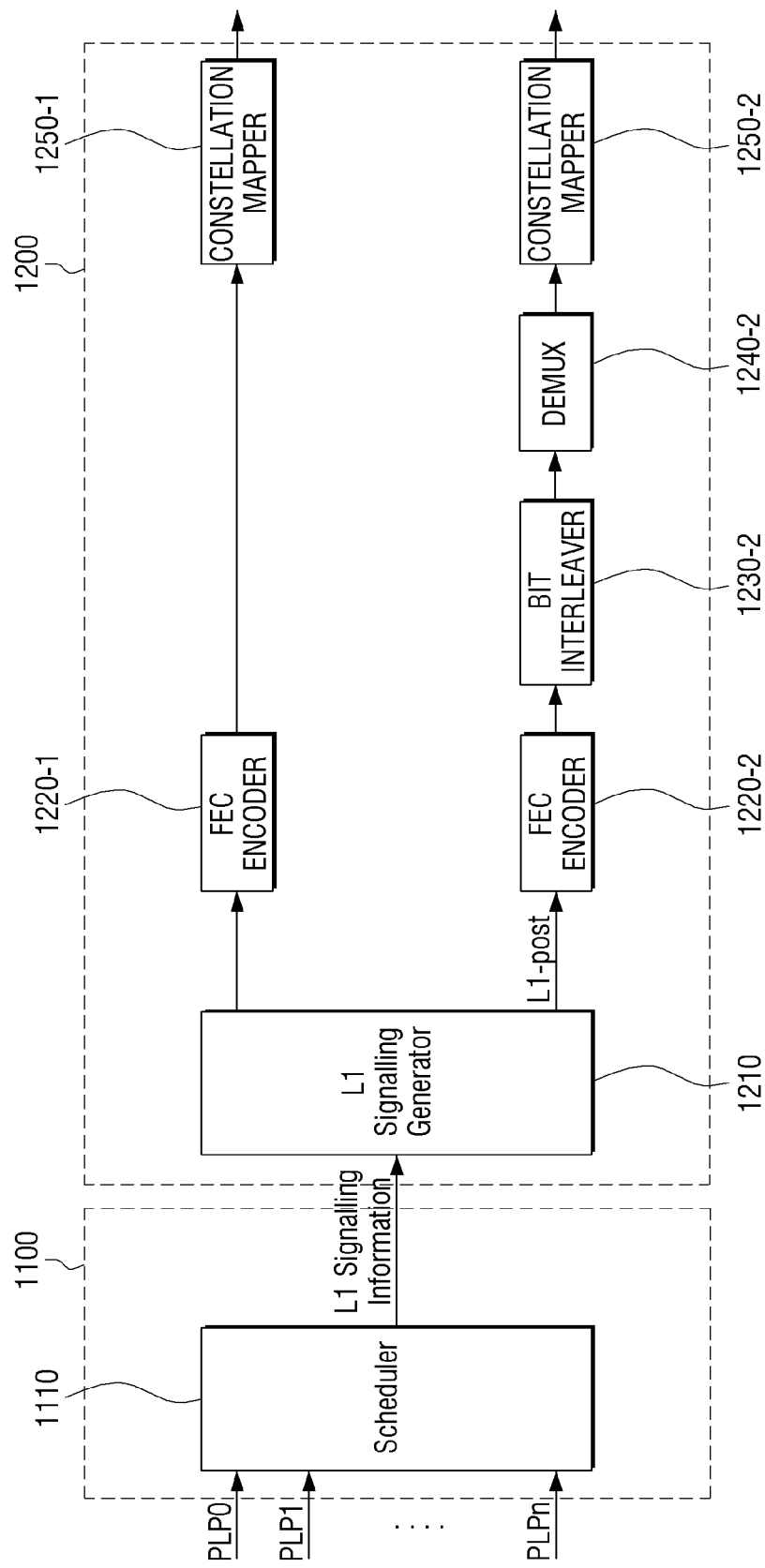
FIG. 20 is a block diagram illustrating elements that generates signaling data, according to an exemplary embodiment.

FIG. 20 is a block diagram illustrating elements that generates signaling data, according to an exemplary embodiment.

In detail, FIG. 20 illustrates an element that generates L1 signaling information used in a DVB-T2 system as shown in FIG. 4. A process of generating such L1 signaling information may be equally applied to a process of the signaling generator 300 used in an ATSC 3.0 system, according to an exemplary embodiment.

Referring to FIG. 20, an input processor 1100 and a BICM encoder 1200 are illustrated. The input processor 1100 may include a scheduler 1110. The BICM encoder 1200 may include an L1 signaling generator 1210, FEC encoders 1220-1 and 1220-2, a bit interleaver 1230, a Demux 1240, and constellation mappers 1250-1 and 1250-2. The BICM encoder 1200 may further include a time interleaver (not shown). Also, the L1 signaling generator 1210 may be included in the input processor 1100.

Service data are respectively mapped onto PLP0 through PLPn. The scheduler 1110 determines a position, and modulation and code rates of each PLP to map a plurality of PLPs onto a physical layer of T2. In other words, the scheduler 1110 generates L1 signaling. The scheduler 1110 may output dynamic information of L1 post signaling of a current frame to the frame builder 1300. The scheduler 1110 may also transmit the L1 signaling to the BICM encoder 1200. The L1 signaling includes L1 pre-signaling and L1 post-signaling.

The L1 signaling generator 1210 discriminately outputs the L1 pre-signaling and the L1 post-signaling. The FEC encoders 1220-1 and 1220-2 respectively perform FEC, including shortening and picturing, on the L1 pre-signaling and the L1-post signaling. The bit interleaver 1230 performs interleaving on the encoded L1 post-signaling in the unit of bits. The Demux 1240 adjusts orders of bits constituting a cell to control robustness of the bits and outputs the cell including the bits. The constellation mappers 1250-1 and 1250-2 respectively map cells of the L1 pre-signaling and the L1 post-signaling onto constellations. The L1 pre-signaling and the L1 post-signaling that are processed through the above-described processes are output to the frame builder 1300. Therefore, the L1 pre-signaling and the L1 post-signaling may be inserted into a frame.

This process of generating the L1 signaling may be equally performed by the signaling generator 300 of FIG. 3. Information about the number of active carriers determined by the cell multiplexer 122 may be included in the generated L1 signaling.

Figure 21:
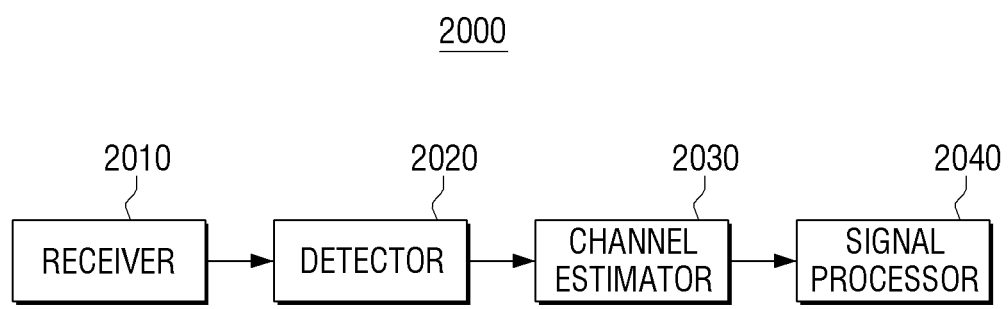
FIG. 21 is a block diagram illustrating a structure of a receiving apparatus, according to an exemplary embodiment.

FIG. 21 is a block diagram illustrating a structure of a receiving apparatus 2000, according to an exemplary embodiment.

Referring to FIG. 21, the receiving apparatus 2000 includes a receiver 2010, a detector 2020, a channel estimator 2030, and a signal processor 2040.

The receiver 2010 receives a transmission stream including an OFDM symbol.

The detector 2020 detects at least one pilot and signaling data from the OFDM symbol.

The channel estimator 2030 may perform channel estimation based on the detected pilot. The signal processor 2040 may acquire information about the number of active carriers, onto which the OFDM symbol is mapped, from the signaling data and signal-process the OFDM symbol based on the acquired information.

In other words, the signal processor 2040 may acquire the information about the number of active carriers to check how many active carriers are used to transmit information. Therefore, the signal processor 2040 may rapidly signal-process the OFDM symbol.

Here, the information about the number of active carriers includes information about the number of active carriers that included in a spectrum, corresponding to the OFDM symbol into which the pilot is inserted, which exists in a preset spectrum mask.

The number of active carriers is determined based on an arrangement pattern of scattered pilots that may be inserted into the OFDM symbol. The number of active carriers is also determined based on at least one selected from a plurality of parameters indicating an arrangement pattern of the scattered pilots and at least one edge pilot inserted into the OFDM symbol. The method of determining the number of active carriers through the transmitting apparatus 100 has been described above, and thus a detailed description thereof is omitted herein.

Figure 22:
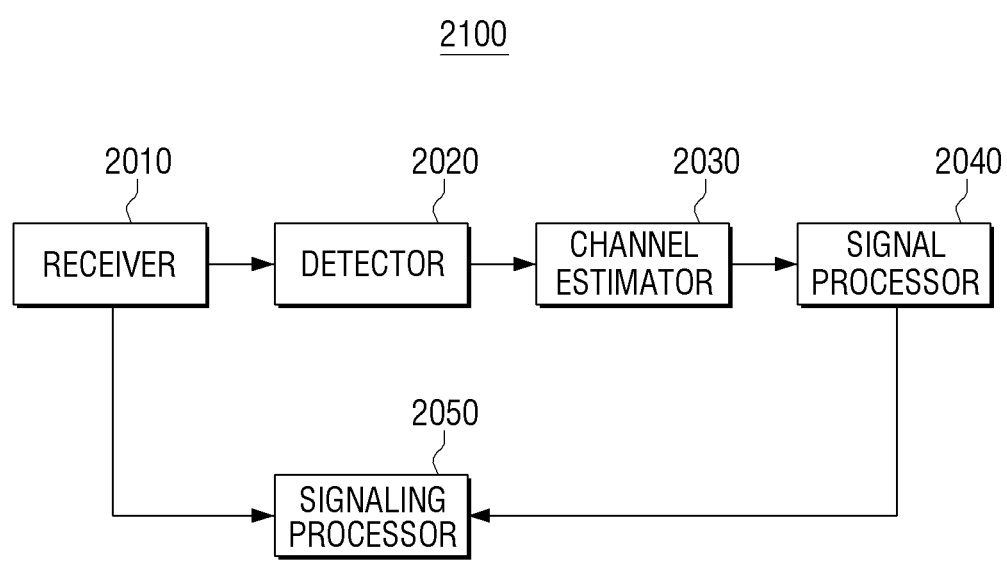
FIG. 22 is a block diagram illustrating a detailed structure of a receiving apparatus, according to another exemplary embodiment.

FIG. 22 is a block diagram illustrating a detailed structure of a receiving apparatus 2100, according to another exemplary embodiment.

In other words, the receiving apparatus 2100 further includes a signaling processor 2050 that processes received signaling data. The receiver 2010, the detector 2020, the channel estimator 2030, and the signal processor 2040 have been described above, and thus their detailed descriptions are omitted herein.

The signaling processor 2050 may extract signaling data from a preamble symbol of a received OFDM symbol. In particular, the signaling processor 2050 may extract L1 signaling.

Figure 23:
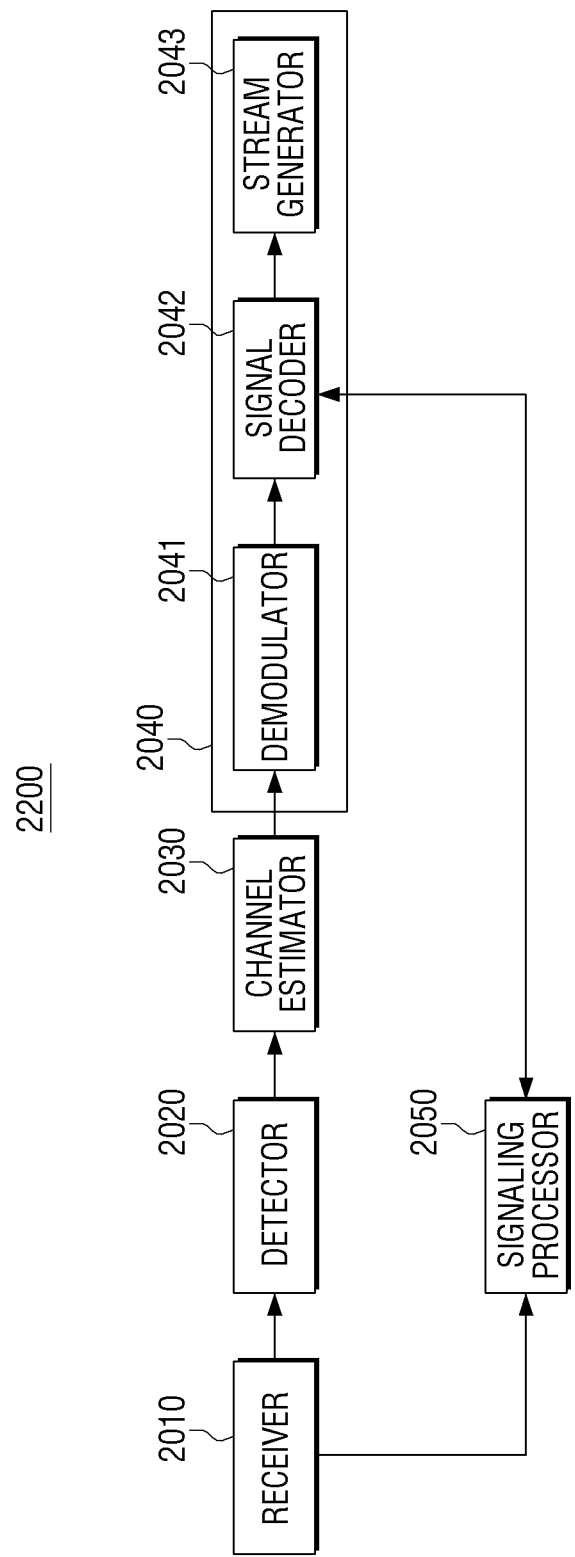
FIG. 23 is a block diagram illustrating a signal processor in detail, according to an exemplary embodiment.

FIG. 23 is a block diagram illustrating the signal processor 2040 in detail, according to an exemplary embodiment.

Referring to FIG. 23, the signal processor 2040 includes a demodulator 2041, a signal decoder 2042, and a stream generator 2043.

The demodulator 2041 performs modulation on a received RF signal according to OFDM parameters to perform a sync detection. If a sync is detected, the demodulator 2041 recognizes whether to receive a mobile frame or a fixed frame from information stored in a sync area.

In this case, if OFDM parameters for a signaling area and a data area are preset, the demodulator 2041 may acquire OFDM parameters for a signaling area and a data area stored in a sync area to acquire and demodulate OFDM parameter information for a signaling area and a data area next to the sync area.

The signal decoder 2042 decodes input data. In this case, the signal decoder 2042 may acquire parameters of an FEC method, a modulation method, etc. of data stored in each data area by using signaling data detected from the signaling processor 2050 to perform the decoding. The signal decoder 2042 may also calculate a start position of data based on data information included in configurable post signaling and dynamic post signaling. In other words, the signal decoder 2042 may calculate a position of a frame from which a corresponding PLP is transmitted.

The stream generator 2043 may process a baseband frame received from the signal decoder 2042 to generate data that is to be serviced.

The stream generator 2043 may generate an L2 packet from an L1 packet whose error is corrected based on values of information about a protocol version of a frame provided from the signaling processor 2050, information about a type of the frame, and information about an insertion method of data.

In detail, the stream generator 2043 may include de-jitter buffers. De-jitter buffers may re-generate accurate timing for restoring an output stream based on the values of the information about the protocol version of the provided frame, the information about the type of the frame, and the information about the insertion method of the data, etc. Therefore, delays for sync between a plurality of PLPs may be compensated for.

Figure 24:
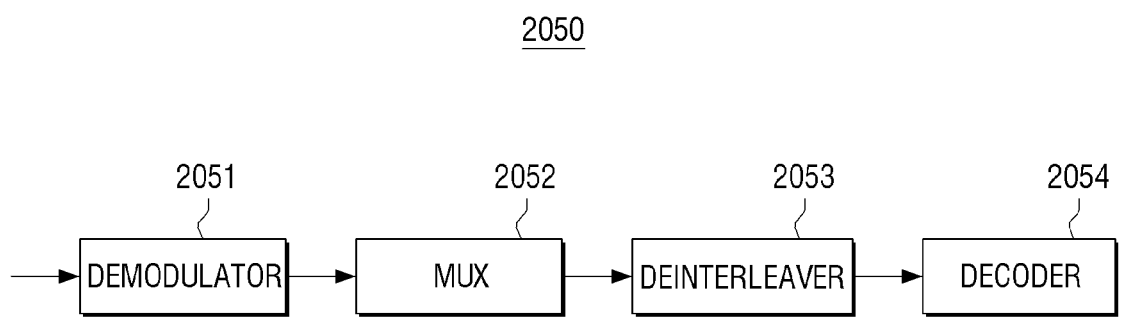
FIG. 24 is a block diagram illustrating a detailed structure of a signaling processor, according to an exemplary embodiment.

FIG. 24 is a block diagram illustrating a detailed structure of the signaling processor 2050, according to an exemplary embodiment.

Referring to FIG. 24, the signaling processor 2050 includes a demodulator 2051, a MUX 2052, a deinterleaver 2053, and a decoder 2054.

The demodulator 2051 receives a signal from the transmitting apparatus 100 and demodulates the signal. In detail, the demodulator 2051 demodulates the received signal to generate a value corresponding to an LDPC codeword and outputs the value to the MUX 2052.

In this case, the value corresponding to the LDPC codeword may be expressed as a channel value of the received signal. Here, the channel value may be determined according to various methods, for example, a method of determining a Log Likelihood Ratio (LLR) value may be used.

Here, the LLR value may be expressed as a value that is acquired by converting a ratio between a probability that a bit transmitted from the transmitting apparatus 100 will be 0 and a probability that the bit will be 1, into a log scale. Alternatively, the LLR value may be a bit value that is determined according to a hard decision or may be a representative value that is determined according to a fraction to which the probability that the bit transmitted from the transmitting apparatus 100 will 0 or 1 belongs.

The MUX 2052 multiplexes an output value of the demodulator 2051 and outputs the multiplexed output value to the deinterleaver 2053. Here, the output value of the demodulator 2051 is a value corresponding to the LDPC codeword, for example, may be an LLR value.

In detail, the MUX 2052 is an element corresponding to the Demux 1240 of FIG. 20 included in the transmitting apparatus 100 and may reversely perform a demultiplexing operation performed by the Demux 1240. In other words, the MUX 2052 performs a parallel-to-serial conversion on the value corresponding to the LDPC codeword output from the demodulator 2051 to multiplex the value corresponding to the LDPC codeword.

The deinterleaver 2053 deinterleaves an output value of the MUX 2052 and outputs the deinterleaved value to the decoder 2054.

In detail, the deinterleaver 2053 is an element corresponding to the bit interleaver 1230 of FIG. 20 included in the transmitting apparatus 100 and may reversely perform an operation performed by the bit interleaver 1230 of FIG. 20. In other words, the deinterleaver 2053 may perform deinterleaving on the value corresponding to the LDPC codeword to enable the deinterleaving to correspond to an interleaving operation performed by the bit interleaver 1230 of FIG. 20. Here, the value corresponding to the LDPC codeword may be, for example, an LLR value.

The decoder 2054 is an element corresponding to the FEC encoder 1220-2 of the transmitting apparatus 100 and may reversely perform an operation performed by the FEC encoder 1220-2. In detail, the decoder 2054 may perform decoding based on the deinterleaved LLR value to output L1 signaling.

Figure 25:
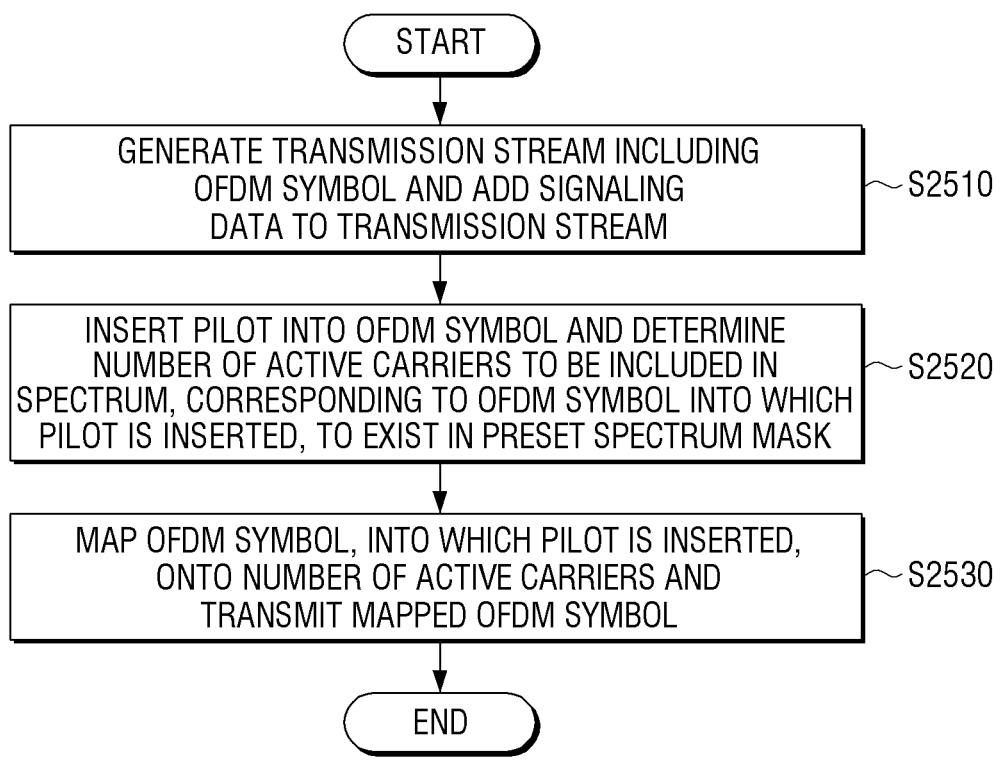
FIG. 25 is a flowchart illustrating a method of controlling a transmitting apparatus, according to an exemplary embodiment.

FIG. 25 is a flowchart illustrating a method of controlling a transmitting apparatus, according to an exemplary embodiment.

Referring to FIG. 25, in operation S2510, the transmitting apparatus generates a transmission stream including an OFDM symbol and adds signaling data to the transmission stream.

In operation S2520, the transmitting apparatus inserts at least one pilot into the OFDM symbol and determines the number of active carriers that is to be included in a spectrum, corresponding to the OFDM symbol into which the pilot is inserted, which exists in a preset spectrum mask.

In operation S2530, the transmitting apparatus maps the OFDM symbol, into which the pilot is inserted, onto the active carriers of the determined number and transmits the mapped OFDM symbol.

Here, in operation S2520, the transmitting apparatus determines the number of active carriers based on an arrangement pattern of at least one scattered pilot to be inserted in the OFDM symbol.

In operation S2520, the transmitting apparatus may determine the number of active carriers based on at least one among a plurality of parameters indicating an arrangement pattern of scattered pilots and at least one edge pilot to be inserted into the OFDM symbol.

The signaling data includes information about the number of active carriers.

The method of controlling the transmitting apparatus according to the exemplary embodiment further includes: performing IFFT on the OFDM symbol into which the pilot is inserted; reducing a PAPR of a signal that is processed by the IFFT; inserting a guard interval into the signal having the reduced PAPR; and converting the signal, into which the guard interval is inserted, into an analog signal.

Figure 26:
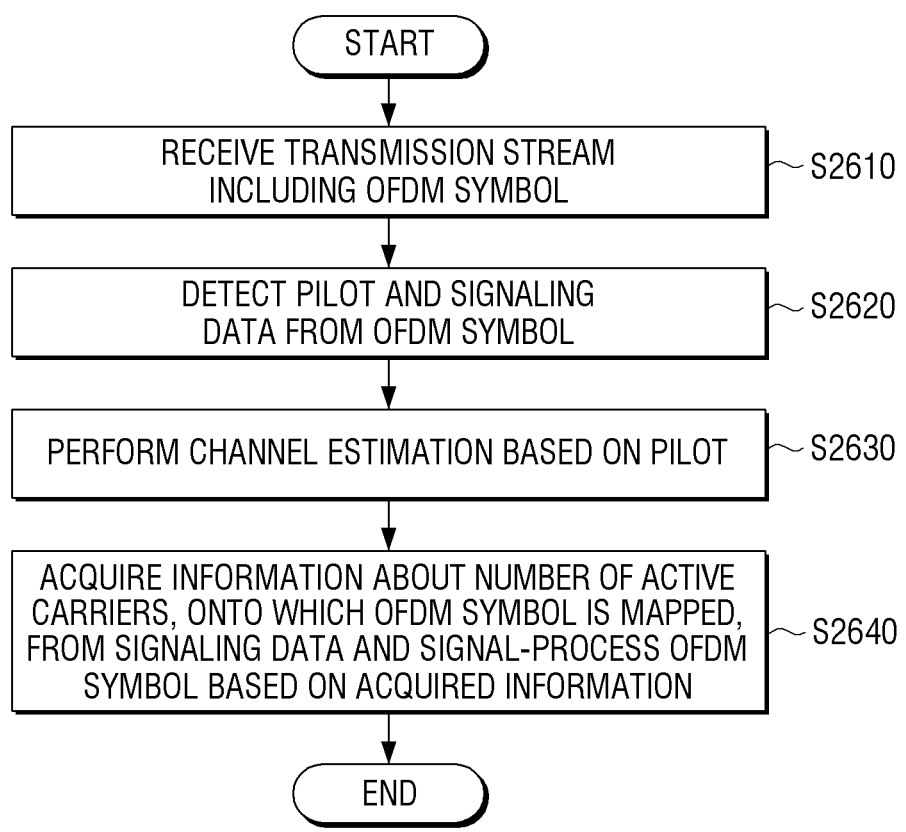
FIG. 26 is a flowchart illustrating a method of controlling a receiving apparatus, according to an exemplary embodiment.

FIG. 26 is a flowchart illustrating a method of controlling a receiving apparatus, according to an exemplary embodiment.

Referring to FIG. 26, in operation S2610, the receiving apparatus receives a transmission stream including an OFDM symbol.

In operation S2620, the receiving apparatus detects at least one pilot and signaling data from the OFDM symbol. In operation S2630, the receiving apparatus performs channel estimation based on the pilot. The receiving apparatus acquires information about the number of active carriers, onto which the OFDM symbol is mapped, from the signaling data and signal-processes the OFDM symbol based on the acquired information.

Here, the information about the number of active carriers includes information about the number of active carriers included in a spectrum, corresponding to the OFDM symbol into which the pilot is inserted, which exists in a preset spectrum mask.

The number of active carriers is determined based on an arrangement pattern of insertable scattered pilots.

The number of active carriers may be determined based on at least one among a plurality of parameters indicating an arrangement pattern of scattered pilots and at least one edge pilot inserted into the OFDM symbol.

According to various exemplary embodiments as described above, the number of active carriers that may be used without straying from a spectrum mask may be determined and used to increase a data transmission rate.

There may be provided a non-transitory computer readable medium that stores a program sequentially performing controlling methods according to the inventive concept.

For example, there may be provided a non-transitory computer readable medium that stores a program performing: generating a transmission stream including an OFDM symbol and adding signaling data to the transmission stream; inserting at least one pilot into the OFDM symbol and determining the number of active carriers to be included a spectrum, corresponding to the OFDM symbol into which the pilot is inserted, which exists in a preset spectrum mask; and mapping the OFDM symbol, into which the pilot is inserted, onto the active carriers of the determined number and transmitting the mapped OFDM symbol.

Also, for example, there may be provided a non-transitory computer readable medium that stores a program performing: detecting at least one pilot and signaling data from an OFDM symbol; performing a channel estimation based on the pilot; and acquiring information about the number of active carriers, onto which the OFDM symbol is mapped, from the signaling data and signal-processing the OFDM symbol based on the acquired information.

The non-transitory computer-readable medium refers to a medium which does not store data for a short time such as a register, a cache memory, a memory, or the like but semi-permanently stores data and is readable by a device. In detail, the above-described applications or programs may be stored and provided on a non-transitory computer readable medium such as a compact disc (CD), a digital versatile disk (DVD), a hard disk, a blue-ray disk, a universal serial bus (USB), a memory card, a read-only memory (ROM), or the like.

At least one of the components, elements or units represented by a block as illustrated in FIGS. 1-5 and 20-24 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a central processing unit (CPU) that performs the respective functions, a microprocessor, or the like. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

The foregoing exemplary embodiments and advantages are merely exemplary and are not to be construed as limiting. The inventive concept can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:
1. A transmitting apparatus comprising:
a structurer configured to generate a transmission stream comprising an orthogonal frequency division multiplexing (OFDM) symbol; and
a transmitter configured to insert at least one pilot into the OFDM symbol based on a parameter of a first pilot pattern among a plurality of pilot patterns, insert data into the OFDM symbol based on a number of active carriers, and transmit the transmission stream comprising the OFDM symbol, wherein the plurality of pilot patterns comprise the first pilot pattern and a second pilot pattern, and wherein the number of active carriers is determined based on the parameter of the first pilot pattern and a parameter of the second pilot pattern.

2. The transmitting apparatus of claim 1, wherein the first pattern is a first scattered pilot pattern, and the second pilot pattern is a second scattered pilot pattern.

3. The transmitting apparatus of claim 2, wherein the transmitter is configured to determine the number of active carriers based on the parameter of the first scattered pilot pattern and the parameter of the second scattered pilot pattern.

4. The transmitting apparatus of claim 1, wherein the transmission stream further comprises signaling data which comprises information about the number of active carriers.

5. The transmitting apparatus of claim 1, wherein the transmitter further comprises:
a pilot generator configured to provide the pilot to a cell multiplexer which determines the number of active carriers;
an inverse Fast Fourier Transform (IFFT) processor configured to perform IFFT on the OFDM symbol into which the pilot is inserted, in response to the OFDM symbol into which the pilot is inserted being mapped onto the active carriers by the cell multiplexer;
a peak-to-average-power ratio (PAPR) reducer configured to reduce a PAPR of a signal output from the IFFT processor;
a guard interval inserter configured to insert a guard interval into a signal output from the PAPR reducer; and
a digital-to-analog converter (DAC) configured to convert the signal, into which the guard interval is inserted, into an analog signal.

6. A method of controlling a transmitting apparatus, the method comprising:
generating a transmission stream comprising an orthogonal frequency division multiplexing (OFDM) symbol inserting at least one pilot into the OFDM symbol based on a parameter of a first pilot pattern among a plurality of pilot patterns, and inserting data into the OFDM symbol based on a number of active carriers; and
transmitting the transmission stream comprising the OFDM symbol,
wherein the plurality of pilot patterns comprise the first pilot pattern and a second pilot pattern, and
wherein the number of active carriers is determined based on the parameter of the first pilot pattern and a parameter of the second pilot pattern.

7. The method of claim 6, wherein the first pilot pattern is a first scattered pilot pattern, and the second pilot pattern is a second scattered pilot pattern.

8. The method of claim 7, wherein the number of active carriers is determined based on the parameter of the first scattered pilot pattern and the parameter of the second scattered pilot pattern.

9. The method of claim 6, wherein the transmission stream comprises signaling data which comprises information about the number of active carriers.

10. The method of claim 6, further comprising:
performing inverse Fast Fourier Transform (IFFT) on the OFDM symbol into which the pilot is inserted;
reducing a peak-to-average-power ratio (PAPR) of a signal processed by the IFFT;
inserting a guard interval into the signal having the reduced PAPR; and
converting the signal, into which the guard interval is inserted, into an analog signal.

* * * * *